Oct. 24, 1950     G. C. RAY     2,526,971
RECOVERY OF OLEFIN HYDROCARBONS
Filed June 11, 1948
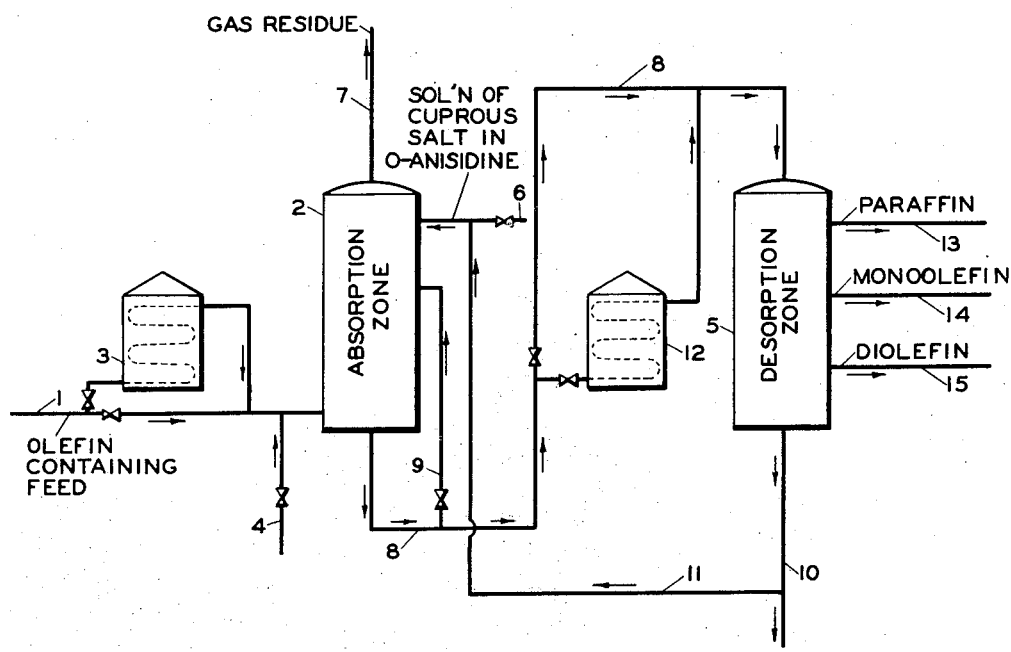
INVENTOR.
G. C. RAY
BY *Hudson & Young*
ATTORNEYS Patented Oct. 24, 1950

2,526,971

UNITED STATES PATENT OFFICE 2,526,971

RECOVERY OF OLEFIN HYDROCARBONS

Gardner C. Ray, Bartlesville, Okla., assignor to Phillips Petroleum Company, a corporation of Delaware Application June 11, 1948, Serial No. 32,356

22 Claims. (Cl. 260—677)

This invention relates to the separation of olefin hydrocarbons from hydrocarbon mixtures containing olefins and more saturated hydrocarbons. In one of its more specific aspects, it relates to the separation of diolefins from monoolefins, diolefins from mixtures of monoolefins and paraffins, and monoolefins from paraffins. In another and more specific aspect, it relates to the separation of ethylene from gaseous mixtures containing the same.

This invention is a continuation-in-part of my copending application, Serial No. 664,747, filed April 25, 1946, now abandoned.

The terms "olefinic" and "olefin" as used herein are intended to embrace open-chain diolefins (especially the aliphatic conjugated diolefins) as well as open-chain monoolefins (i. e. aliphatic monoolefins).

The process of this invention comprises the contacting of a hydrocarbon mixture containing unsaturated hydrocarbons and more saturated hydrocarbons with a solution of a cuprous salt dissolved in orthoanisidine. Contacting is conducted under such conditions that substantial amounts of the least saturated hydrocarbon are dissolved. More specifically, the hydrocarbon mixture may comprise olefins and saturated hydrocarbons, or diolefins and monoolefins, in each case the least saturated material being dissolved by the solvent. The cuprous solution containing the dissolved hydrocarbons is separated from the residual hydrocarbons and passed to a stripping zone. The unsaturated hydrocarbons are removed from the solution in a relatively pure form by applying heat and/or reducing pressure in this zone.

It has long been known that olefins react with cuprous salts in aqueous or nonaqueous media to yield easily decomposable addition products, while paraffin hydrocarbons do not. It is also known that cuprous salts preferentially react with diolefins instead of monoolefins. This reactivity of olefins with cuprous salts has been applied to the separation of olefins from more saturated hydrocarbons. Because of the very low solubility of most cuprous salts in water, various aqueous and nonaqueous solvents have been utilized to dissolve the cuprous salts. Known processes using aqueous media have employed hydrochloric acid or ammonia to bring appreciable amounts of the cuprous salt into solution. The use of these solvents has proven unsatisfactory for several reasons. For example, if hydrochloric acid is used, much corrosion of equipment is suffered. If ammonia is employed, special procedures and equipment are required to prevent loss of ammonia during absorption and evolution of the olefins.

The use of aqueous or nonaqueous solutions of cuprous salts dissolved in organic nitrogen bases or phenols has been proposed as a means of overcoming the aforementioned difficulties attendant to the use of aqueous cuprous solutions for olefin recovery (Evans, U. S. Patent 2,376,239; Robey, U. S. Patent 2,245,719; Imperial Chemicals Ltd., French Patent 797,470; Joshua and Stanley, U. S. Patent 2,005,500).

The principal object of the present invention is to provide an improved process and reagent for the separation and/or recovery of olefins. Another object is to provide an improved process and reagent for recovering diolefins from monoolefins or mixtures of monoolefins and saturated hydrocarbons. Another object is to provide an improved process and reagent for recovering monoolefins from saturated hydrocarbons. Another object is to provide an improved process and reagent for recovering ethylene from gaseous mixtures containing the same in admixture with saturated hydrocarbons such as methane, ethane and propane, with or without hydrogen. Another object is to provide an improved process and reagent for recovering diolefins, especially aliphatic conjugated diolefins, such as butadiene, isoprene and piperylene, from admixture with saturated hydrocarbons. Numerous other objects will hereinafter appear.

The accompanying drawing portrays diagrammatically one arragement of equipment which may be employed for carrying out the process of the present invention.

In its broadest aspect, my invention is a process for separating olefins from admixture with saturated hydrocarbons and diolefins from admixture with monoolefins or monoolefins and saturated hydrocarbons which comprises contacting the hydrocarbon mixture containing the olefin or olefins and the saturated hydrocarbon or the mixture containing the diolefins and monoolefins with a solution of a cuprous salt in orthoanisidine.

Ordinarily the process of my invention is carried out in such manner as not only to accomplish separation of the olefin from the saturated hydrocarbon or other olefin initially in admixture therewith, but also to effect recovery of the olefin in concentrated form. The recovery of the olefin is usually effected by subjectig the olefin-containing solution resulting from the contacting step and after separation of said solution from the undissolved hydrocarbon, which separation is ordinarily carried out by simply withdrawing the olefin-containing solution from the scrubbing zone, to at least one of pressure reduction or heating to cause liberation of the dissolved olefin. The olefin is probably held in the form of a soluble olefin-cuprous salt complex or addition compound which is capable of being dissociated by reducing the pressure or applying heat or both.

Generally speaking, the conditions under which the contacting or absorption step is conducted are such that the olefin-containing hydrocarbon feed is in the gaseous state. As will be obvious, this may be insured by the use of a temperature above the critical temperature or by the use of a pressure below the condensation pressure where use of a pressure equal to or greater than the condensation pressure would result in condensation of the hydrocarbon at the temperature employed. In some cases it may be desirable to expedite maintenance of the hydrocarbon in the gaseous phase by admixture with an inert non-condensable gas if the feed hydrocarbon mixture contains an insufficient amount of such a gas. Examples of such a gas are methane, ethane, hydrogen, nitrogen. The gas should be oxygen-free and inert toward either the hydrocarbon mixture or the reagent and should have substantially no solubility in the reagent. The amount of such gas is preferably sufficiently great to lower the condensation temperature or dew-point of the hydrocarbon mixture to a value substantially below the temperature employed in the absorption step.

I have discovered that orthoanisidine dissolves unexpectedly large quantities of cuprous salts (in excess of 15 per cent). I have further found that the resulting solutions have a high capacity for dissolving olefin hydrocarbons and an inertness toward paraffins and also a higher capacity for dissolving diolefin hydrocarbons in preference to monoolefin hydrocarbons. These solutions have a higher capacity for dissolving olefins than any disclosed in the prior art. This capacity is a distinct advantage, since smaller-scale equipment may be used to accomplish a given separation. It is especially advantageous in separating olefins from paraffins when the concentration of the olefin to be recovered is comparatively low. The mixture to which the process is applied may consist of a single paraffin and one or more olefin hydrocarbons or of a single olefin and one or more paraffin hydrocarbons, or a single monoolefin and one or more diolefins or a single diolefin and one or more monoolefins. Thus ethylene may be separated from methane, ethane, propane and/or butane; ethylene, propylene, butylenes, butadiene, etc. may be separated from methane, ethane, propane, and/or butanes; butadiene, isoprene, piperylene, etc. may be separated from monoolefins such as butene-1, isobutylene, butene-2, the various pentenes and the like, and/or from paraffins such as propane, butane, and pentane. In some cases both a monoolefin and a diolefin may be present and may be recovered separately by the process of the present invention. The term "saturated hydrocarbon," as used herein, includes in its broadest meaning both the acyclic and the alicyclic paraffin hydrocarbons, but generally has reference to the acyclic paraffins since the alicyclic paraffins, i. e. naphthenes, are seldom found in admixture with the acyclic diolefins and monoolefins. This process may be applied to the separation of the components of normally liquid as well as those of normally gaseous olefin-paraffin mixtures and diolefin-monoolefin mixtures. Thus, pentenes may be separated from pentanes, hexenes from hexanes, etc.

As stated above, the process of my invention is preferably executed with the hydrocarbon mixture in the gaseous phase. Any suitable method of contacting the gases with the liquid solution of cuprous salt may be employed. The preferred procedure is to contact countercurrently the hydrocarbon mixture in the gas phase with the liquid in a tower provided with bubble plates or other contact elements such as sprays, packing, baffles, etc.

If desired, means may be provided for mechanical agitation of the scrubbing liquid (i. e., the reagent solution) and the olefin-containing gas in order to greatly increase the rate of dissolving olefin. The rate of dissolving olefin may be slow in the absence of such mechanical agitation. Instead of positively agitating, as by means of a rotated stirrer, I may use any suitable means for attaining fine subdivision of the gas and scrubbing solution and the desired high degree of intimacy of contact therebetween. Thus, the scrubbing tower may be provided with orifices, porous plates, perforated trays, baffles, the usual bubble trays, etc. In some cases a combination of stirring and baffling may be employed. Rapidly rotating turbines which trap the gas and divide it into small bubbles more readily absorbed by the liquid may be used.

Generally the solution of cuprous salt in orthoanisidine is injected continuously into the top of the scrubbing tower and allowed to descend therein in intimate countercurrent contact with the ascending gas, the hydrocarbon feed being injected continuously into the bottom of the tower. The gas withdrawn from the top is essentially or completely free from olefin when separating olefin-paraffin mixtures or free of diolefin when separating diolefin-monoolefin mixtures. The olefin-containing scrubbing liquid is withdrawn continuously from the bottom of the tower. If it is not completely saturated with respect to olefin, a suitable portion may be recycled and introduced into the tower at a point which may be substantially below the point of introduction of the fresh reagent at the top. In this way the concentration of olefin may be caused to attain the desired level in the stream passed to the desorption step. The balance of the stream withdrawn from the bottom of the absorber or, in the case where no such recycling is employed, the entire stream so withdrawn is passed to the desorption step where it is treated to effect the liberation of the dissolved olefin in concentrated form. The thus regenerated reagent solution, after cooling if necessary, is recycled to the absorber.

The conditions of absorption may vary within wide limits so long as they are such that the olefin is preferentially dissolved while the saturated hydrocarbon is not dissolved to any substantial extent, or so the diolefin is preferentially dissolved at the expense of the monoolefin. The pressure and temperature are the two principal conditions which will be varied to obtain the desired result. Obviously the absorption pressure and temperature are adjusted or selected with reference to one another. In general the absorption pressure may range from atmospheric to any desired superatmospheric pressure. Pressures ranging from atmospheric to 500 pounds per square inch gauge will generally be used. Superatmospheric pressures are preferred because the quantity of olefin dissolved is greatly increased by elevated pressure. Thus, pressures of from 50 to 500 pounds per square inch gauge are often preferred.

The preferred maximum absorption temperature is 30° C. The temperature may range from 30° C. downwardly to any economically feasible temperature, say —30° C. The preferred temperature is from 10 to 25° C. since this does not entail excessive refrigeration costs. The lower the temperature of absorption, the greater the absorption. However since orthoanisidine freezes at 5.2° C., temperatures as low as this or lower cannot be used without causing solidification of the reagent. In order to keep the reagent liquid at temperatures of this order, it is necessary to use a low-freezing diluent for the reagent. Any suitable inert organic liquid which is miscible with orthoanisidine and has a sufficiently low freezing point may be used for this purpose. Examples are methyl alcohol, ethyl alcohol, acetone, etc. The anti-freeze should be inert with respect to orthoanisidine, the cuprous salt and the components of the hydrocarbon feed.

Desorption of the olefins is suitably conducted by increasing the temperature of the olefin-enriched solution to 40 to 100° C. or by releasing or reducing the pressure on the solution. A combination of these methods is very satisfactory. In some cases the pressure to which the solution is reduced may be considerably below atmospheric obtained by drawing a vacuum on the desorption zone. The regenerated solution may be reused in a continuous process.

Acetylene and hydrogen sulfide precipitate copper from cuprous salt-orthoanisidine solutions. Removal of these compounds from raw gas mixtures prior to absorption in cuprous salt-orthoanisidine solutions is therefore desirable.

In the drawing the olefin-containing hydrocarbon mixture enters absorption unit 2 via line 1. If the mixture is in liquid phase, it is preferably gasified by passage through heater 3. If desired, an inert non-condensable gas may be introduced via line 4 into admixture with the gaseous feed in an amount sufficient to prevent condensation. The solution of cuprous salt in o-anisidine is injected continuously through line 6. The olefin-denuded gas is removed from unit 2 through line 7. The olefin-containing solution is withdrawn via line 8 and passed to desorption unit 5. A portion of this material may be recycled, if desired, via line 9 to absorption unit 2. Under certain conditions, it may be desirable to heat the olefin-containing stream before introducing same to desorption unit 5. When this is desirable all or a portion of the material is passed through heater 12. The desorption may be accomplished in any suitable manner such as is described above. When a mixture containing paraffins, monoolefins and diolefins is being separated, small portions of paraffin are removed from unit 5 through line 13, monoolefins are removed through line 14, and diolefins are removed through line 15. In the event that the materials to be separated contain only monoolefins and paraffins, line 15 may be closed off. The lean cuprous salt-o-anisidine solution is removed from unit 5 via line 10 and may either be discarded or regenerated, or recycled via lines 11 and 6 to absorption unit 2. Makeup absorption solution may be introduced via line 6, as required.

The strength of the solution of cuprous salt in orthoanisidine, i. e., the percentage by weight of cuprous salt based on the weight of the solution, may vary within wide limits. Ordinarily it will range from 5 per cent to saturation under the conditions of temperature employed in the absorption zone. The more nearly saturated the solution the more economical is the process because the greater is the capacity of the solution for dissolving olefins and the lower is the rate of circulation and the smaller the equipment required for a given throughput of olefin-containing feed. A saturated solution of cuprous chloride in o-anisidine at room temperature will contain over 15 per cent of cuprous chloride.

In some cases an excess of cuprous salt over the amount required to give a saturated solution may be employed with good results. The excess should be finely divided to give a smooth slurry.

The reagent generally consists of the cuprous salt, such as cuprous chloride, and orthoanisidine. However, in unusual situations an antifreeze liquid may be included in the reagent as explained above.

The reagent is usually in the form of a simple solution of the cuprous salt dissolved in orthoanisidine. However, in some circumstances I may dispose the solution on a suitable adsorptive or absorptive solid carrier such as pumice, diatomaceous earth, sawdust, asbestos, charcoal, bauxite, etc., in which case the method of operation will be modified somewhat from that employed when the liquid reagent is used. When practicing my invention utilizing a solid carrier such as those named above for the cuprous salt-o-anisidine solvent, it is preferable to utilize at least two absorption towers, or series of two absorption towers. In this manner, a semi-continuous process may be carried out by absorbing olefins in one tower and desorbing them in the other. When the absorbent reaches a suitable point of saturation, the hydrocarbon stream is switched to the next tower wherein the absorbent has been desorbed.

Preparing the absorbent media for this particular method of operation is well within the skill of the art; however, one very suitable method is as follows: The solid carrier is soaked in a solution of the cuprous salt-o-anisidine for a sufficient time to allow the reagent to permeate the carrier. The carrier is then thoroughly drained by any suitable means and is ready for use. One very satisfactory method for utilizing the thus prepared absorbent is to place it on shallow trays within the absorption tower. However, it may also be placed as a contiguous mass within the tower whereby very satisfactory results may also be had.

In some commercial installations, it may be desirable to reduce the partial pressure of olefin in equilibrium with a cuprous salt-o-anisidine solution by passing an inert gas into the system. Such a case may be illustrated as follows: olefins are concentrated from a lean olefin stream (such as refinery gases) by combining them with the reagent of the present invention. The "fat" reagent containing the absorbed olefin is then passed to a stripping or desorption zone, where an isoparaffin is introduced. The off-gas from the stripper or desorber would then constitute an olefin-isoparaffin stream suitable for use as an alkylation feed stock. The ratio of olefin to isoparaffin is readily controlled by the temperature and pressure used in the stripping operation.

To the best of my knowledge and belief, the cuprous chloride-o-anisidine solution prepared as described in the foregoing has higher absorption coefficients for olefins than any similar cuprous solutions reported in the prior art (volume of olefin dissolved per volume of solution). It is calculated that using a 15.7 weight per cent solution of cuprous chloride in o-anisidine, a circulation rate of only 600,000 gallons per day would be required to recover 100,000 pounds of ethylene per day from a 5 per cent stream available at 300 pounds per square inch.

Many advantages flow from the practice of the present invention. The solution is not corrosive. No loss of ammonia is involved as has been the case when ammonical solutions are used. The solution exhibits excellent thermal stability. The solubility of paraffin hydrocarbons in the solution is reasonably low. The solubility of the olefin hydrocarbons is extremely high. Hence sharp olefin-paraffin separations result. Excellent selectivity between diolefin and olefin is also exhibited. Complete recovery of the dissolved olefin by desorption is readily accomplished in a simple and economical manner. The solution is long-lasting so that chemical consumption is low.

In the following examples, the cuprous salt employed was cuprous chloride. This particular cuprous salt was used because of its relatively low cost and ready availability. Other cuprous salts such as cuprous nitrate, iodide, bromide, formate, acetate, butyrate, etc., or any other cuprous salt which is soluble in orthoanisidine may, however, be used within the scope of this invention.

*Example I*

A solution prepared by dissolving 1.20 grams of solid cuprous chloride in 6.1 cc. of o-anisidine was contacted with pure ethylene at one atmosphere pressure at 24° C. Equilibrium was reached when 118.7 cc. of ethylene had been absorbed. This volume corresponds to an absorption coefficient of 18.5 (volumes of gas per volume of solution under the conditions of the experiment) and to about 0.4 mole of ethylene dissolved per mole of cuprous chloride. To show the effect of releasing the pressure on this solution, the following table gives the amount of olefin in solution at several equilibrium pressures:

| Moles Ethylene dissolved/mole CuCl | Equilibrium Pressure, mm. Hg |
|---|---|
| 0.40 | 750 |
| 0.25 | 290 |
| 0.10 | 105 |
| 0.00 | 40 |

*Example II*

A solution of 0.836 gram of cuprous chloride in 6.0 cc. of o-anisidine was contacted with pure ethylene at 23° C. and one atmosphere pressure. After equilibrium was reached, 81.3 cc. of ethylene were in solution. The temperature of the solution was successively raised, and the quantity of ethylene desorbed at each of several equilibrium temperatures was measured. The following table indicates the quantity of ethylene recovered by thermal desorption:

| Equilibrium Temperature, °C. | Cumulative vol. per cent of initial ethylene recovered |
|---|---|
| 57 | 70.1 |
| 82 | 88.2 |
| 98 | 94.3 |

At the end of this experiment, the cuprous chloride-o-anisidine solution was heated for 17 hours at 100° C. and then cooled to 23° C. The capacity for absorbing ethylene at 23° C. and one atmosphere pressure was the same as before the thermal treatment. This example indicates a reasonably satisfactory degree of thermal stability for this solution.

*Example III*

A solution was made by dissolving 1.338 grams of cuprous chloride in 6.7 cc. of o-anisidine was contacted with ethylene at one atmosphere pressure at 25° C. When equilibrium was reached, 125.9 cc. of ethylene had been absorbed. When the pressure on the solution was released, ethylene was desorbed. The amounts of this olefin desorbed from this solution at several equilibrium pressures are given below:

| Cumulative cc. of ethylene desorbed | Equilibrium Pressure, mm. Hg |
|---|---|
| 15 | 560 |
| 45 | 300 |
| 60 | 220 |
| 75 | 160 |
| 90 | 118 |

*Example IV*

This example illustrates the low capacity of cuprous chloride-o-anisidine solutions for dissolving paraffin hydrocarbons.

A solution made by dissolving 1.04 grams of cuprous chloride in 6.0 cc. of o-anisidine was contacted with pure propane at one atmosphere pressure and 24° C. Under these conditions only 9.9 cc. of propane had been absorbed when equilibrium was reached. This volume corresponds to an absorption coefficient of only 1.6.

*Example V*

In this example the solubilities of 1-butene and butadiene were first determined in a solution of o-anisidine and then in a solution of o-anisidine containing 13 weight per cent cuprous chloride. Each determination was made at 27° C. and 750 mm. pressure. The solubility and ratio of butadiene to 1-butene dissolved are listed below in tabular form.

| Gas | Solvent | Solubility[1] | Ratio of Butadiene to 1-Butene |
|---|---|---|---|
| 1-Butene | o-anisidine | 6.7 | 1.99 |
| Butadiene | do | 13.3 | |
| 1-Butene | o-anisidine+13 weight per cent CuCl | 14.3 | 1.74 |
| Butadiene | o-anisidine+13 weight per cent CuCl | 24.9 | |

[1] Volumes of gas per liquid volume of absorbent.

This example shows the increased volume of material dissolved by the o-anisidine-cuprous chloride solution over that dissolved by o-anisidine by itself. The selectivity of o-anisidine for separating 1-butene and butadiene was found to be greater than that of the o-anisidine-cuprous chloride solution. This is offset, however, by the increased volume of materials dissolved in the second run. Thus, equipment of smaller size may be used, thereby effecting economy of operation.

*Example VI*

A mixture of 50 mol per cent butadiene and 50 mol per cent 1-butene is contacted with a solution of cuprous chloride-o-anisidine, containing about 13 weight per cent cuprous chloride, at room temperature and two atmospheres total pressure, and in accordance with my process, until equilibrium is attained. The gas recovered by desorption of the cuprous chloride-o-anisidine solution contains 63.6 mol per cent butadiene and 36.4 mol per cent 1-butene. Said desorption is carried out by reducing the pressure on the system to atmospheric pressure and by heating to 100° C.

I claim:

1. A process for separating olefin hydrocarbons from admixture with more saturated hydrocarbons which comprises contacting the hydrocarbon mixture with a reagent comprising a solution of a cuprous salt in orthoanisidine.

2. A process for separating olefin hydrocarbons from admixture with more saturated hydrocarbons which comprises contacting the hydrocarbon mixture with a reagent comprising a solution of cuprous chloride in orthoanisidine.

3. A process for separating olefin hydrocarbons from admixture with more saturated hydrocarbons and recovering the least saturated hydrocarbons in concentrated form which comprises contacting the hydrocarbon mixture containing the hydrocarbons and the more saturated hydorcarbons with a reagent comprising a solution of at least 5 weight per cent of a cuprous salt in orthoanisidine under such conditions that the least saturated hydrocarbons are preferentially dissolved in said solution, separating the resulting unsaturated hydrocarbon-containing solution from the undissolved hydrocarbons and desorbing said unsaturated hydrocarbons from said reagent.

4. A process according to claim 3 wherein said cuprous salt-orthoanisidine reagent is supported on a porous carrier.

5. The process for separating olefins from admixture with saturated hydrocarbons which comprises contacting the hydrocarbon mixture containing the olefin and the saturated hydrocarbon with a reagent comprising a solution of a cuprous salt in orthoanisidine.

6. A process according to claim 5 wherein the cuprous salt is selected from the group consisting of cuprous nitrate, cuprous iodide, cuprous bromide, cuprous formate, and cuprous acetate.

7. The process for separating olefins from admixture with saturated hydrocarbons and recovering the olefins in concentrated form which comprises contacting the hydrocarbon mixture containing the olefin and the saturated hydrocarbon with a reagent comprising a solution of at least 5 weight per cent of a cuprous salt in orthoanisidine under such conditions that the olefin is preferentially dissolved in said solution while the saturated hydrocarbon remains substantially undissolved, separating the resulting olefin-containing solution from the undissolved hydrocarbon, and desorbing the olefin from said resulting solution.

8. The process for separating olefins from admixture with saturated hydrocarbons and recovering the olefins in concentrated form which comprises intimately contacting the hydrocarbon mixture containing the olefin and the saturated hydrocarbon in the gaseous state with a reagent comprising a solution of a cuprous salt in orthoanisidine under such conditions that the olefin is preferentially dissolved in said solution while the saturated hydrocarbon remains substantially undissolved, separating the resulting olefin-containing solution from the undissolved hydrocarbon, and desorbing the olefin from said resulting solution by subjecting said solution to at least one of pressure reduction and heating.

9. The process for separating olefins from admixture with saturated hydrocarbons and recovering the olefins in concentrated form which comprises intimately contacting the hydrocarbon mixture containing the olefin and the saturated hydrocarbon in the gaseous state with a reagent comprising a solution of cuprous chloride in ortho anisidine under such conditions that the olefin is preferentially dissolved in said solution while the saturated hydrocarbon remains substantially undissolved, separating the resulting olefin-containing solution from the undissolved hydrocarbon, and desorbing the olefin from said resulting solution by subjecting said solution to at least one of pressure reduction and heating.

10. A process according to claim 9 wherein the olefin is desorbed from said solution by pressure reduction.

11. A process according to claim 9 wherein the olefin is desorbed from said solution by heating.

12. The process for separating monoolefins from admixture with paraffin hydrocarbons which comprises contacting the hydrocarbon mixture containing the monoolefin and the paraffin hydrocarbon with a reagent comprising a solution of a cuprous salt in orthoanisidine.

13. The process for separating monoolefins from admixture with paraffin hydrocarbons and recovering the monoolefins in concentrated form which comprises contacting the hydrocarbon mixture containing the monoolefin and the saturated hydrocarbon with a reagent comprising a solution of a cuprous salt in orthoanisidine under such conditions that the monoolefin is preferentially dissolved in said solution while the paraffin hydrocarbon remains substantially undissolved, separating the resulting monoolefin-containing solution from the undissolved paraffin hydrocarbon and desorbing the monoolefin from said resulting solution.

14. The process for separating monoolefins from admixture with paraffin hydrocarbons and recovering the monoolefins in concentrated form which comprises intimately contacting the hydrocarbon mixture containing the monoolefin and the saturated hydrocarbons in the gaseous state with a reagent comprising a solution of a cuprous salt in orthoanisidine under such conditions that the monoolefin is preferentially dissolved in said solution while the paraffin hydrocarbon remains substantially undissolved, separating the resulting monoolefin-containing solution from the undissolved paraffin hydrocarbon, and desorbing the monoolefin from said resulting solution by subjecting such solution to at least one of pressure reduction and heating.

15. The process for separating monoolefins from admixture with paraffin hydrocarbons and recovering the monoolefins in concentrated form which comprises intimately contacting the hydrocarbon mixture containing the monoolefin and the paraffin hydrocarbon in the gaseous state with a reagent comprising a solution of 5 to 18 weight per cent cuprous chloride in orthoanisidine under such conditions that the monoolefin is preferentially dissolved in said solution while the paraffin hydrocarbon remains substantially undissolved, separating the resulting monoolefin-containing solution from the undissolved paraffin hydrocarbon, and desorbing the monoolefin from said resulting solution by subjecting said solution to at least one of pressure reduction and heating.

16. The process for separating ethylene from admixture with at least one paraffin hydrocarbon which comprises contacting the hydrocarbon mixture containing the ethylene and the paraffin hydrocarbon with a reagent comprising a solution of a cuprous salt in orthoanisidine.

17. The process for separating ethylene from admixture with at least one paraffin hydrocarbon and recovering the ethylene in concentrated form which comprises intimately contacting the hydrocarbon mixture containing the ethylene and the paraffin hydrocarbon in the gaseous state with a reagent comprising a solution of a cuprous salt in orthoanisidine under such conditions that the ethylene is preferentially dissolved in said solution while the paraffin hydrocarbon remains substantially undissolved, separating the resulting ethylene-containing solution from the undissolved hydrocarbon, and desorbing the ethylene from said resulting solution by subjecting said solution to at least one of pressure reduction and heating.

18. The process for separating ethylene from admixture with at least one paraffin hydrocarbon and recovering the ethylene in concentrated form which comprises intimately contacting the hydrocarbon mixture containing the ethylene and the paraffin hydrocarbon with a reagent comprising a solution of cuprous chloride in orthoanisidine under such conditions that the ethylene is preferentially dissolved in said solution while the paraffin hydrocarbon remains substantially undissolved, separating the resulting ethylene-containing solution from the undissolved paraffin hydrocarbon, and desorbing the ethylene from said resulting solution by subjecting said solution to at least one of pressure reduction and heating.

19. The process for separating an aliphatic diolefin from admixture with a paraffin hydrocarbon which comprises contacting the hydrocarbon mixture containing the diolefin and the paraffin hydrocarbon with a reagent comprising a solution of a cuprous salt in orthoanisidine.

20. A process for separating olefin hydrocarbons from admixture with more saturated hydrocarbons, which comprises intimately contacting the hydrocarbon mixture containing the olefins and the more saturated hydrocarbons in the gaseous state with a reagent comprising a solution of cuprous chloride in orthoanisidine at a temperature in the range of −30 to 30° C. and a pressure in the range of atmospheric to 500 pounds per square inch gauge, such that the olefin is preferentially dissolved in said solution, separating the resulting olefin-containing solution from undissolved hydrocarbon, and desorbing said olefin from said resulting solution by subjecting said solution to an elevated temperature in the range of 40 to 100° C.

21. A process for separating diolefins from admixture with monoolefins which comprises intimately contacting the hydrocarbon mixture containing the diolefins and monoolefins in the gaseous state with a reagent comprising a solution of a cuprous salt in orthoanisidine under such conditions that the diolefin is preferentially dissolved in said solution, separating the resulting diolefin-containing solution from the undissolved hydrocarbon, and desorbing said diolefin from said resulting solution by subjecting said solution to at least one of pressure reduction and heating.

22. A process for separating diolefins from admixture with monoolefin hydrocarbons and recovering the diolefins in concentrated form, which comprises intimately contacting the hydrocarbon mixture containing said diolefins and said monoolefins in the gaseous state with a reagent comprising a solution of 5 to 18 weight per cent cuprous chloride in orthoanisidine under such conditions that said diolefin is preferentially dissolved in said solution, separating the resulting diolefin-containing solution from said undissolved monoolefin, and desorbing said diolefin from said solution by subjecting said solution to at least one of pressure reduction and heating.

GARDNER C. RAY.

REFERENCES CITED

The following references are of record in the file of this patent:

UNITED STATES PATENTS

| Number | Name | Date |
|---|---|---|
| 1,999,345 | Stevens et al. | Apr. 30, 1935 |
| 2,391,102 | Patterson | Dec. 18, 1945 |
| 2,395,529 | Arnold | Feb. 26, 1946 |